Jan. 1, 1935. O. DAHL ET AL 1,986,559
TRAWL NET WITH FREE GROUND ROPE
Filed March 3, 1934   3 Sheets-Sheet 1

INVENTORS:
OSCAR DAHL
WILLIAM FORSYTH BLACK
BY: Francis E. Boyce
ATTORNEY

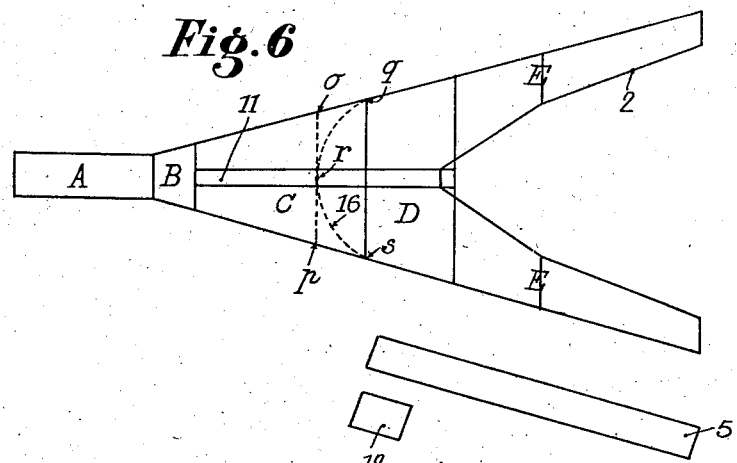
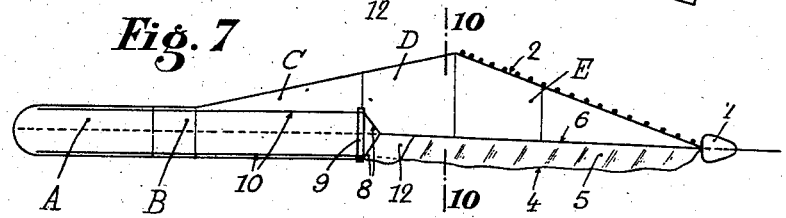
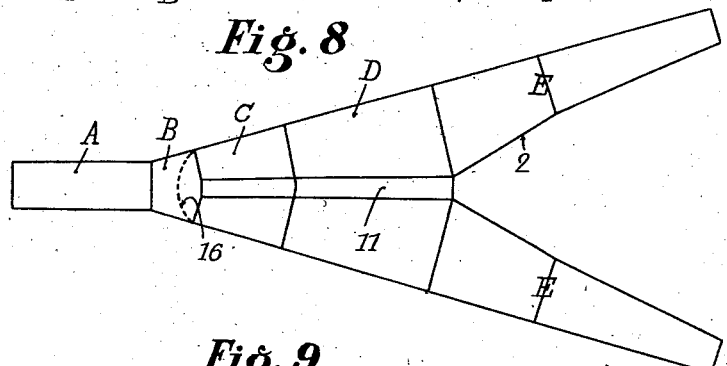
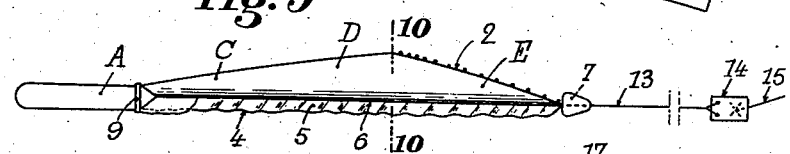
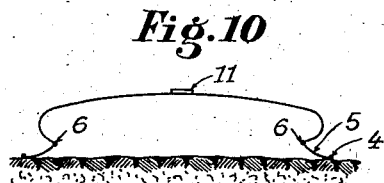
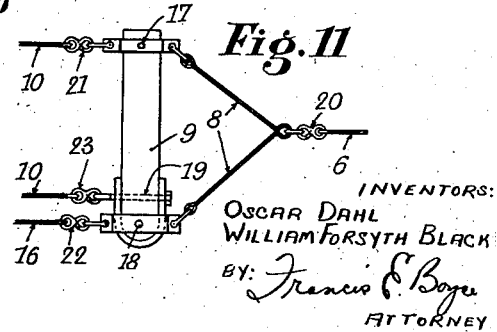
INVENTORS:
Oscar Dahl
William Forsyth Black
BY: Francis E. Boyer
ATTORNEY

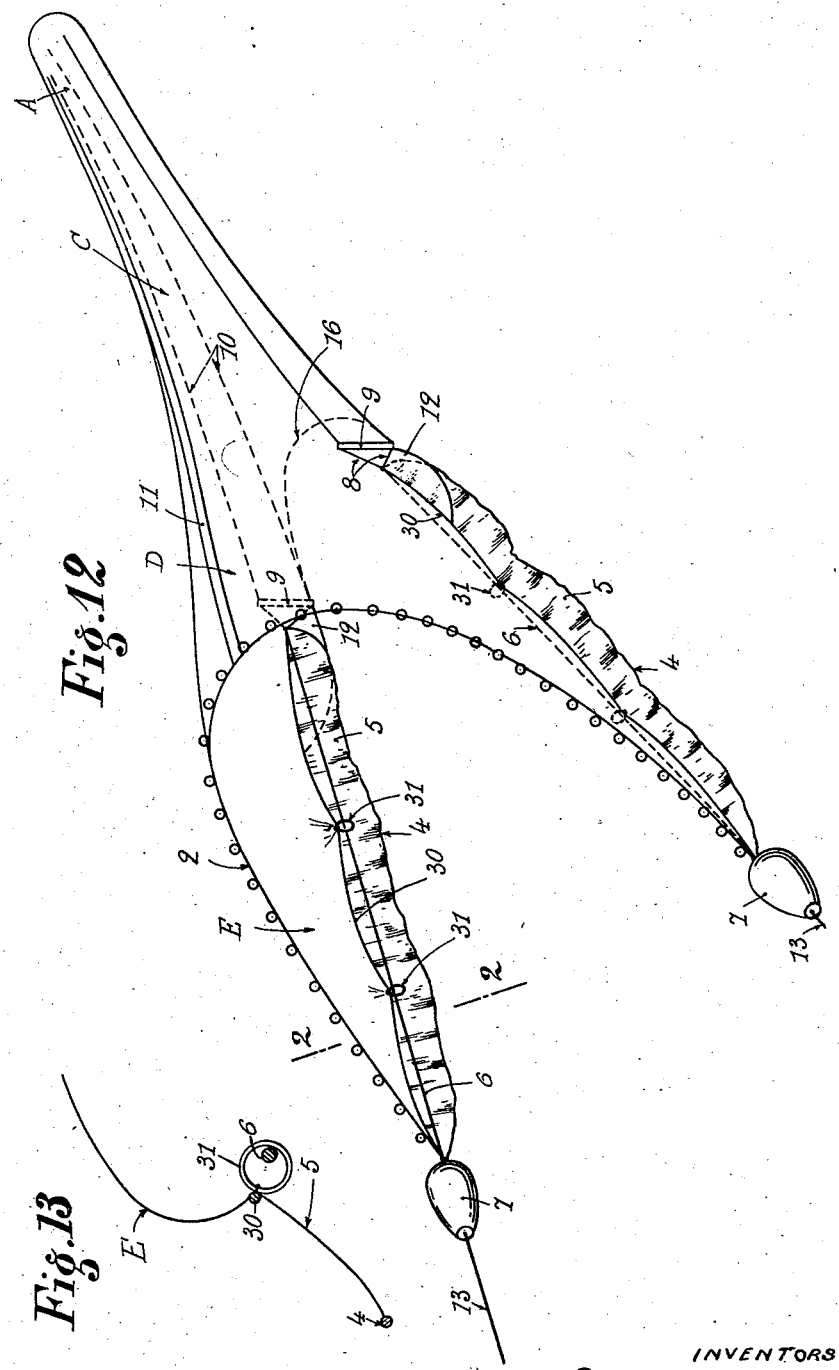

Patented Jan. 1, 1935

1,986,559

UNITED STATES PATENT OFFICE 1,986,559

TRAWL NET WITH FREE GROUND ROPE

Oscar Dahl and William Forsyth Black,
La Rochelle, France

Application March 3, 1934, Serial No. 713,824
In France April 13, 1933

7 Claims. (Cl. 43—9)

On most of the trawl nets, the traction of the towing cables is imparted to the rear pocket through the meshes, thus partially closing same, which interferes with the proper evacuation of the water entering the net and increases the resistance to travel. The small immature fish are retained, thus reducing the stock of fish in the sea. On the other hand, in order to obtain a net of a given width in the fishing position, the width or the number of meshes of the net sheets must be increased in proportion to the closure of the meshes in the fishing position; this increases the weight and cost of the net and the difficulty of its handling.

Attempts have been made to relieve the meshes of trawls nets from traction stresses, by imparting the towing force to side ropes, running from the end of the wings to the rear-pocket of the net; but such attempts, made with nets of conventional construction, never succeeded, because the proper shape of such conventional nets, in the fishing position, can only be obtained when the head rope and the ground rope are well stretched, and experience shows that it is not possible to relieve the meshes from the traction stresses while at the same time keeping the ground rope stretched; it has been found that, when the towing force is transmitted to the rear pocket by tensioned side ropes, the ground rope becomes slack, the belly forms folds and becomes filled with mud, and the net fails to operate; on the other hand, a pocket is formed in the upper sheet in front of the rear pocket of the net.

These defects have been partially remedied by dispensing with the usual belly and ground rope of the net, that is by constructing a net in which the rear pocket of the net is drawn directly by two traction cables to which are attached, on the one hand, a covering sheet, and on the other hand, weighted bands of netting forming curtains bordered at their lower edges by a free ground rope, as described in the specification of Letters Patent No. 1,943,372, dated January 16, 1934.

In nets of this class, the meshes are relieved from the traction stresses, and the drawbacks due to the formation of folds in the belly are entirely eliminated, but certain difficulties are still present, due to the formation of a pocket in the upper sheet of the net, in front of the rear pocket.

It would be possible to eliminate this pocket by lengthening the traction cables of the rear pocket, but they would then act as the side cables of the usual nets, traction would be transmitted through the meshes, and the rear pocket would rise off the ground, as set forth in the patent specification above mentioned.

The invention has broadly for its object to provide a trawl net with free ground rope, either provided or not with a belly, of such construction that the meshes are fully opened, whereby the transverse dimensions of the net will be equal to those of other nets now in use, while sparing at least 50% of net material, and with all the subsequent advantages, such as lightness, low cost, small resistance to travel, saving of fuel, more ready handling, etc.

A further considerable advantage of the full opening of the meshes is that it enables the small immature fish to escape and to restock the fishing grounds.

A further object of the invention is to provide a net construction by which the formation of a pocket in the upper sheet is decidedly avoided, and by which the net is efficiently kept against the sea-bottom, even when the net is deprived of belly.

With these obects in view, the invention consists of a net, either provided or not with a belly, in which the upper sheet and the wings are connected to lateral traction cables, which are considerably shorter (about 20 to 25%) than the corresponding edges of the upper sheet and wings, and in which a portion of the ground rope is mounted free or slack at the lower ends of curtains suspended from the said traction cables, this net comprising a top traction member, for example, a cable or rope, located on the axis of the upper sheet and having the same length as the corresponding part of the lateral traction cables, this top traction member being adapted to co-operate with the lateral traction cables in order to assure the full opening of the meshes and to maintain the rows of meshes in transverse vertical planes so as to avoid the formation of a pocket in front of the rear pocket of the net, which otherwise takes place by the effect of the shortening of the lateral traction cables.

It has been found that with this improved arrangement, that is, by giving to the top traction member and to the lateral traction cables a length which is from 20 to 25% shorter than the net sheets to which they are attached, a net having 100 to 200 meshes in width will afford at least as great a net opening as a net of conventional type having 300 meshes in width; on the other hand it has been found that the net opening remains constant during the fishing operation, whereas the meshes of the nets in current use close up progressively according as the rear pocket becomes weighted with fish and detritus.

It has been further observed that the formation of a pocket at the entrance of the rear pocket is efficiently avoided; the traction cables of the rear pocket actually transmit the towing force to the rear pocket, and they are thus straight and well taut and are parallel with the ground; the rear pocket of the net may be securely held against the sea-bottom by a simple adjustment of the length of the head rope, even when the net is deprived of belly.

A class of nets (boeuf net, towed by two boats), is already known, in which the two halves of the net are joined along a top rope and a bottom rope, these ropes being employed to transmit the towing force of the boat to the rear pocket of the net and to facilitate the assembling of the parts of the net. However, the provision of a top rope or top traction member in a trawl having a free ground rope and shortened lateral traction cables, either provided or not with a belly, affords the important advantages of preventing the formation of a pocket in front of the rear pocket of the net and of imparting to the net the same opening as an ordinary net, with a saving of material of at least 50%.

In the accompanying drawings:

Fig. 6 is a plan view of a net according to the invention having a free ground rope and a belly.

Fig. 7 is an elevational view of the same.

Fig. 8 is a view similar to Fig. 6, showing a net with free ground rope and without belly.

Fig. 9 is an elevational view of the same.

Fig. 10 is a section on the line 10—10 of Fig. 7 or of Fig. 9.

Fig. 11 shows a detail of the arrangement of the vertical posts to which the traction cables are attached.

Fig. 12 is a perspective view of a net according to the invention, showing the method of assembling the front upper sheet, the hanging curtains and the traction cables.

Fig. 13 is a partial section on the line 13—13 of Fig. 1.

Figure 1:
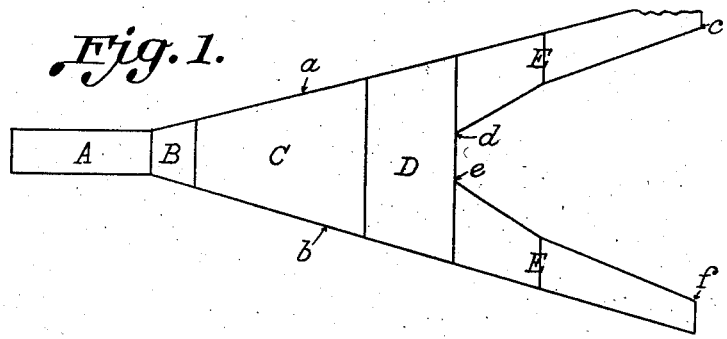
Figs. 1 and 2 show by way of comparison the top and the bottom sheets of an ordinary V. D. net with stretched ground rope.
Figure 2:
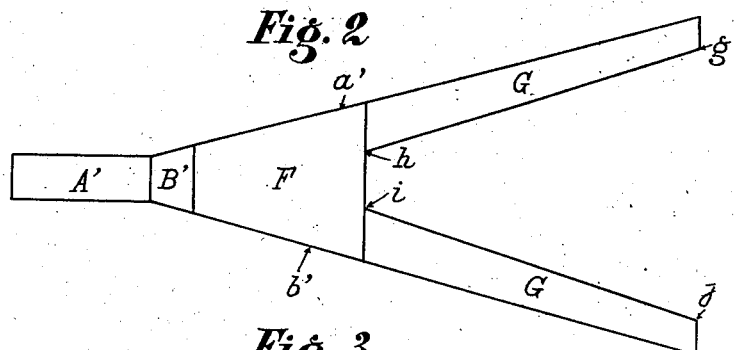

Referring to Figs. 1 and 2, the usual V. D. nets (that is nets provided with wings adapted to bulge out upwardly and which are connected with the shear boards by long dragging cables), are constructed in the following manner: the upper sheet comprises the rear pocket A, a top neck B, a back piece C, a covering sheet D, and top wings E; the lower sheet comprises the rear pocket A', a bottom neck B', a belly F and lower wings G. The upper and lower sheets are attached to side ropes 1 (Fig. 3) along the sides $a, b, a', b'$. The side ropes are attached to the sides $a\ b, a'\ b'$, while the latter are fully stretched, with their meshes entirely closed. The head rope 2 is attached along $c\ d\ e\ f$, and the ground rope along $g\ h\ i\ j$.

In the fishing position, the ground rope and the head rope are well stretched, and the traction is transmitted to the rear pocket A A' through the meshes. The side ropes 1 become slightly shortened when they are wet, and this somewhat opens the adjacent meshes; but these side ropes are not sufficiently stretched to transmit the traction, and experience shows that they will swell or bulge laterally together with the net.

Figure 3:
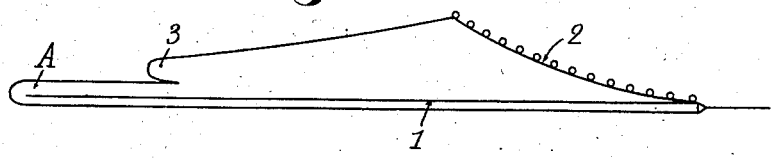
Fig. 3 is an elevational view showing the pocket which is formed in the front upper sheet of a net having shortened traction cables and deprived of a top traction member.

If an attempt is made to shorten the side ropes in order to relieve the meshes from the traction stresses, that is if the side ropes are mounted on the sides $a\ b\ a'\ b'$ of the net sheets, with the meshes of the latter more or less open, so that the traction will be transmitted by the side ropes, it is found that:

1.—The head rope, the covering sheet D, and the back piece C are drawn to the rear and form a pocket 3 in front of the rear pocket 2 (Fig. 3).

This is due to the fact that the meshes of a net are very extensible, under the action of the water entering the net, the upper sheet will lengthen, thus closing up these meshes, the length of each diagonal of the mesh being changed from $k\ l$ (Fig. 4) to $k'\ l'$ (Fig. 5) and the length of the upper sheet passing from L to L'.

Thus, the shortening of the side ropes, which is intended to relieve the meshes in order that they may open completely, will in fact cause the closing of these meshes, owing to the formation of the pocket 3.

The fish which collect in this pocket 3, instead of swimming into the rear pocket A, are retained entangled in the meshes. As the net is extensible, its length increases according as the fish accumulate in pocket 3, whereby the latter increases in size and prevents the fish from entering the rear pocket. Finally, the fish which are confined in this pocket are free to escape when the net reaches the surface, during the operation of hauling on board.

2.—Owing to the shortening of the side ropes, the ground rope becomes slack, the belly F becomes folded and sinks in the mud, and the net fails to operate.

The invention obviates these drawbacks in the following manner:

The traction is transmitted to the rear pocket laterally by two traction cables, at the upper part by a top traction member, and at the lower part by the ground rope and the belly (when the presence of this latter is considered necessary), but, in order to obviate the drawback of dragging on the bottom a ground rope which is very long and strongly stretched, the major part of the ground rope, that is, the part which borders the usual bottom wings along $g\ h$ and $i\ j$ is replaced by a free ground rope, attached to net bands which are freely suspended and which replace the bottom wings G, the front ridge only of the belly being bordered with a relatively short stretched ground rope. This arrangement permits of securing the complete opening of the meshes, while at the same time maintaining the balance of shape of the net, that is, without the formation of a pocket in front of the rear pocket and without folds in the belly (where this exists), on the one hand, while considerably reducing the drawbacks due to the usual ground rope (collecting of detritus, catching upon obstacles on the ground, etc.), on the other hand.

Figure 4:
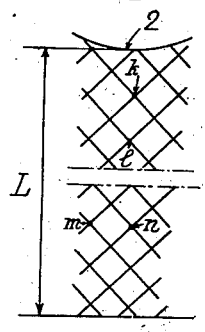
Figs. 4 and 5 are diagrams explaining the formation of the pocket in the upper sheet.
Figure 5:
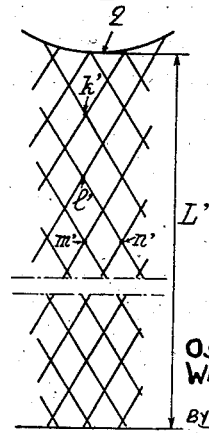

The complete opening of the meshes has the effect of increasing the size of the net in width, since the length of the transverse diagonals of the meshes changes from $m'\ n'$ (Fig. 5) in a net whose meshes are partially closed, to $m\ n$ (Fig. 4)

in a net with open meshes. This increase in the width is of the order of magnitude of 60% as compared with an ordinary net.

The invention thus permits of greatly reducing the amount of net material employed to construct a net having a given width of opening.

Figs. 6 and 7 show by way of example a net according to the invention, provided with a belly, and Figs. 8 and 9 a net according to the invention deprived of belly.

In Fig. 6 A. B. C. D. E. indicate the same parts as in Fig. 1, but the pieces of netting employed have a width which is much smaller, for the same useful effect. Thus, at the seam between pieces D and E, the net according to the invention will have for instance 220 meshes in width, whilst the net shown in Fig. 1, for the same useful effect, must have 330 meshes in width at this place. Experience shows that this saving of material affords a material reduction in the cost of the net. As the net is lighter it is easier to handle during bad weather; its smaller resistance to travel affords a saving of fuel.

The lower part of the net shown in Fig. 6 is similar to that of Fig. 2 as concerns the parts A', B', but the belly is smaller inasmuch as it is limited at the front by the dotted line $o\,p$.

The stretched ground rope 16 is reduced to the part $q\,r\,s$, which, at the front, borders the belly and the very small lower wings $q\,o\,r$ and $r\,s\,p$. While the ground rope of the known net (Fig. 2) comprised long stretched portions $h\,g$, $i\,j$, the major part of the ground rope of the improved net is free, and comprises at each side a slack cable 4, attached to the lower part of net bands 5, freely suspended from lateral cables 6. These cables 6 are attached along the lower edges of the covering sheet D and of the top wings E; at the front part, they are attached to conical devices 7, or similar devices, and at the rear of the crow foot 8 of a vertical post 9. The two posts are located at the points $q\,s$, and their upper and lower ends are attached respectively to rear traction cables 10, which extend to the rear pocket of the net; 11 denotes the top traction member, running from the head rope 2 to the seam between the back piece C and the top neck B. The rear vertical edge of the curtain 5 is free and the space existing between this edge and the post 9 is obturated by a small external curtain 12.

The arrangement of the lateral cables 6 and the top traction member 11 is such that these parts will be about 20 to 25% shorter than the edges of the net sheets to which they are attached, that is, the length of the lateral cables or of the top traction member attached to five straight meshes of the piece of netting herein considered will be from 7, 5 $m$ to 8 $m$ measured when dry, $m$ being the length, when dry, of the side of a mesh in said piece of netting.

Experience shows that, due to the shortening of the lateral cables and of the top traction member, the meshes of the net are well open, but without forming a pocket in the upper sheet, whilst the small tensioned portion $q\,r\,s$ of the ground rope keeps the belly well stretched, in the case in which the net comprises a belly.

This belly can however be eliminated, as shown in Figs. 8 and 9.

The net shown in Figs. 8 and 9 is of the type described in specification No. 1,943,372 above mentioned, that is, it comprises a rear pocket A, provided at its mouth with vertical posts 9, which are drawn by lateral cables 6, attached to the rear part of conical members 7 or the like, which are connected, by net cables 13, with shearboards 14, drawn by towing hawsers 15 leading to the boat. To cables 6 are attached the back piece C, the covering sheet D, and the top wings E, which are bordered in front by the head rope 2, provided with floats; from cables 6 are suspended the hanging curtains 5, which are bordered at the lower part by the weighted free ground rope 4. The rear pocket is bordered in front by the stretched portion 16 of the ground rope, of very short length.

In the same manner as in an ordinary net, the shortening of the lateral cables tends to cause the formation of a pocket in the upper sheet, in front of the rear pocket, but this shortening is indispensable in this case in order to hold the rear pocket of the net against the sea bottom, as set forth in the specification No. 1,943,372 above mentioned. The provision of a top traction member 11, by eliminating said pocket, permits of shortening the lateral cables 6 and of holding the rear pocket of the net upon the ground, while at the same time affording the saving of material above indicated.

In the net shown in the drawings, it is supposed that the top traction member 11 consists of a narrow band of netting, made of strong cord. However, it may also consist of a cable, rope or the like.

In Fig. 6, the parts of the net have a trapezoidal shape, as in the usual V. D. nets. In this construction of the net, the uniform distribution of the slack along the top traction member is an easy matter, since the sheets of netting possess a row of straight meshes in this place, that is, the diagonals of the meshes, in the middle part of the trapezoidal upper sheet are parallel with the top traction member. If $mD$ is the length of the side of a mesh in the covering sheet D, the middle part of the covering sheet will be attached to a certain length $KmD$ of the top traction member, K being a constant coefficient. In like manner, $mC$ being the length of the side of a mesh in the back piece C, the middle part thereof will be attached to a certain length $KmC$ of the top traction member, and so on, K being the same constant coefficient of shortening.

Owing to the uniform distribution of the "slack" of the upper sheet and of the wings, all the meshes, whatever be their size and location, will be well open.

However, the distribution of the slack along the lateral traction cables 6 will be more delicate, as the meshes at the edges of the trapezoidal net sheets are irregular.

Instead of adopting a constant coefficient of shortening K, from one end to the other of the lateral cables and top traction member, recourse may be had to the following arrangement:

The lateral traction cables situated on each side of the net, proceeding from the ends of the wings to the vertical posts 9, are 25% shorter than the wings and the edges of the covering sheet to which they are attached.

Up to the transverse plane of the vertical posts, the corresponding portion of the top traction member, in the middle vertical plane of the net, is 25% shorter than the upper sheet, that is, it has the same length as the lateral traction cables 6 which are attached to an equal length of the net.

Starting from the transverse plane of the vertical posts, the length of the top traction member as far as the seam between the top neck and the rear pocket is about 20% shorter than the net sheet.

In the rear of the vertical posts, and on each side of the net, the two superposed traction cables 10, which run from the top and bottom of said posts to the end of the rear pocket, are uniformly spaced from the centre of the net, in height, by 15 meshes, upon the whole length. These traction cables to which the traction of the rear pocket is transmitted, are given the same length as the portion of the top traction member in the corresponding part of the net. The traction of the rear pocket of the net is thus effected by simple lateral traction cables, and then by double traction cables, in combination with the top traction member situated in the middle of the upper sheet.

Typical dimensions of the parts of this new form of net are indicated below, solely by way of illustration.

The rear pocket together with the top neck have the same total length as those of a V. D. net (about 9 metres) and the belly, together with the small wings have a total length of 8 to 10 metres; the superposed lateral traction cables 10, which run from the top and bottom of the vertical posts to the end of the rear pocket, each possesses a total length of about 19 metres, whilst the simple lateral traction cables 6, which are raised above the ground, and connect the conical members 7 with the posts 9 and to which the hanging curtains are attached, have a length of 21 metres; only 4 metres of those cables are attached to the edges of the covering sheet, which is 8 metres in length.

The stretched portion 16 of the ground rope is 7 to 8 metres in length, whilst the length of the free ground rope is 2×21=42 metres (the stretched ground rope of a corresponding ordinary net would have 49 metres). This corresponds to a ratio of about 80 to 85% between the length of the free portion of the ground rope and the total length of the ground rope.

This ratio may obviously vary according to the length of the wings, which determines the length of the free ground rope; this ratio will further be greater in the case of a net without belly. In practice, the length of the stretched portion of the ground rope will vary from 2 to 8 metres, according to the size of the net employed.

The vertical posts 9 are 1,20 metres high, and the conical members 7 are 70 centimetres in diameter.

Obviously, these figures are only given for the better understanding of the invention, but they are by no means of a limitative character.

The arrangement of the part of the net shown in Fig. 6 may be replaced if desired by the arrangement shown in Fig. 8, in which the upper part of the net is constructed in such manner that along the lateral edges of the covering sheet and of the top wings, the diagonal of the meshes will be parallel with the said lateral edges. The regular distribution of the slack of the lateral straight meshes along the lateral traction cables will be easier in this case, whilst the regular distribution of the slack of the central meshes along the top traction member is somewhat more difficult.

The top and the bottom of the net may also consist of a plurality of rectangular net sheets, in which the number and the size of the meshes, which are constant for each part, gradually decrease from one part to the next one, from the head rope 2 to the rear pocket A, as in the usual "boeuf" net.

It has been ascertained, by tests made with models of small size, that a net according to the invention will bulge laterally beyond the cables 6 (Fig. 10), and this aids in maintaining the net upon the sea-bottom. In the nets with free ground rope, with or without belly, according to the present invention, the vertical posts 9 may be mounted in a removable manner, as shown in Fig. 11.

The crow-foot 8 is attached to fittings 17, 18, to which are respectively connected the upper traction cable 10 and the small ground rope 16, by means of scissors claws 21—22. Another fitting 19 is connected by a scissors claw 23 with the lower traction cable 10. The apex of the crow-foot 8 is conected by a scissors claw 20 with the front lateral traction cable 6. By means of the scissors claws 20, 21, 22, 23, the vertical posts 9 are readily mounted in place upon the net supplied by the manufacturer.

In all the nets above described, it is preferable to provide the following arrangement: the top of the net is connected with the hanging curtains by a connecting rope 30 of hemp or manila to which are attached several rings 31 arranged within the net and preferably equidistant. The number of rings at each side is preferably two or three. The traction cable 6, which preferably consists of steel, and is much shorter than the connecting rope 30, extends through said rings, thus transmitting the traction to the rear pocket A. The difference in length between the connecting rope 30 and the traction cable 6, taking account of the shrinkage of the manila connecting rope when it is wet (this shrinkage being from 5 to 6 cm. per metre), should not be more than 20 to 50 cm, in order to prevent the formation of a pocket in front of the vertical posts 9.

The connecting rope 30 is about 25% shorter than the edges of the upper sheet and of the wings.

Experience shows that this arrangement offers important advantages.

In the first place, experience shows that the formation of pockets, in front of the rear pocket, is thereby obviated, while at the same time preventing the hanging curtains from passing towards the interior of the net with reference to traction cables 6.

On the other hand, when the apparatus rises along the slopes of the ground, or travels on a coral bottom, so that the net will rub upon obstacles, the net, which slightly bulges out between the attaching points of the rings, is held away from the obstacles, even at the attaching points of the rings, because these rings have an appreciable diameter.

The replacing of the manila traction cables by steel cables will greatly reduce the wear which is observed in the case of manila cables upon coral or other sea-bottoms.

The use of the steel traction cables obviates the deformation of the net which takes place with manila ropes, due to the fact that one of these latter will always lengthen more than the other; when the net is lanched at sea, the traction cable 6 and the net cable 13 which run from the front of the boat are subjected to a greater traction stress than the traction cable 6 and the net cable 13 which run from the rear of the boat, thus producing the unequal lengthening of the manila ropes. On the contrary, the steel cables are not subject to any permanent lengthening.

Since the traction cables 6 are not integrally connected with the net, they may be very rapidly replaced; their length is well determined, and no account is to be taken of the uniform distribution of the slack of the net, which is regulated once for all during the mounting of the connecting ropes.

Finally, the traction cables 6 may be employed in order to raise the rear pocket of the net on board. For this purpose, they are detached from the conical devices 7 at the ends of the wings, when these have reached the gallows mounted at the front and rear on each side of the trawler, and they are wound on the heads of the winches in order to hoist the rear pockets of the net on board.

Obviously, the invention is applicable to all nets having a free ground rope, whatever be the method of towing (two boats or a single boat), and the method of spreading the net in width (V. D. system, ottertrawl, beam and irons trawl, etc.).

In particular, the invention can be applied advantageously to nets which are towed by two boats, as it permits to eliminate the frequent accidents to these nets, and also permits to greatly improve this fishing gear.

Having now described our invention what we claim as new and desire to secure by Letters Patent is:

1. In a trawl net, a bag-shaped rear net portion, lateral cables attached to said rear net portion, a head rope attached to the ends of said lateral cables, free hanging net curtains suspended from said lateral cables, a funnel-shaped front net portion attached at the front to said head rope and along its lateral edges to said lateral cables, whereby the length of said edges, before connection with said lateral cables, is at least about 20% larger than the length of the latter, and a top traction member attached to said rear net portion, said front net portion and the middle of said head rope, the length of said traction member being equal to the length of said lateral cables in any section of the net from the head rope to the rear pocket of the net.

2. In a trawl net, a bag-shaped rear net portion, two vertical posts arranged respectively at both sides of the mouth of said rear net portion, an upper and a lower lateral rear cable, attached to each side of said rear net portion as far as the rear pocket of the net and removably connected with the top and bottom of the corresponding vertical post, a single lateral front cable removably attached to the middle of each vertical post, a head rope attached to the ends of said single lateral front cables, free hanging curtains suspended from said single lateral cables, a funnel-shaped front net portion attached at the front to said head rope and along its lateral edges to said lateral cables, whereby the length of said edges, before connection with said lateral cables, is at least about 20% larger than the length of the latter, and a top traction member attached to said rear net portion, said front net portion and the middle of said head rope, the length of said traction member being equal to the length of said lateral cables in any section of the net from the head rope to the rear pocket of the net.

3. In a trawl net as claimed in claim 2, a belly for said rear net portion, a ground rope connected at its ends with the bottom of said vertical posts and in its middle portion with said belly and small underwings connecting the front of said belly with said ground rope.

4. A trawl net as claimed in claim 2 wherein the length of the lateral edges of the rear part of said front net portion, before connection with said upper lateral rear cables is about 20% larger than the length of the latter, whilst the length of the lateral edges of the front part of said front net portion, before connection with said single lateral front cables is about 25% larger than the length of the latter.

5. In a trawl net as claimed in claim 1, a foot rope bordering the front lower edge of said rear net portion and adapted to be stretched in operation and free weighted cables bordering the lower edges of said net curtains and adapted to be slack in operation, said foot rope and weighted cables forming the ground rope of the net, the ratio between the length of said slack cables and the total length of said ground rope being at least 80%.

6. In a trawl net, a rear net portion, an upper sheet attached to said rear net portion, lateral cables attached to said rear net portion, and to the edges of said upper sheet, which are substantially longer, before connection, than said lateral cables, loose net curtains suspended from said lateral cables, a number of equidistant rings attached to said lateral cables, inwardly of the net, and traction cables extending loosely through said rings and attached to the ends of said lateral cables, said traction cables being somewhat shorter than said lateral cables in the wet state.

7. In a trawl net as claimed in claim 6, a top traction member attached to said upper sheet in the longitudinal axis thereof and whose length is substantially equal to that of said lateral cables.

OSCAR DAHL.
WILLIAM FORSYTH BLACK.